No. 746,805. PATENTED DEC. 15, 1903.
J. T. FARMER.
APPARATUS FOR HEATING AIR.
APPLICATION FILED MAR. 23, 1903.
NO MODEL. 4 SHEETS—SHEET 1.

WITNESSES:

INVENTOR

No. 746,805. PATENTED DEC. 15, 1903.
J. T. FARMER.
APPARATUS FOR HEATING AIR.
APPLICATION FILED MAR. 23, 1903.
NO MODEL. 4 SHEETS—SHEET 3.

WITNESSES:

John T. Farmer
INVENTOR

No. 746,805. PATENTED DEC. 15, 1903.
J. T. FARMER.
APPARATUS FOR HEATING AIR.
APPLICATION FILED MAR. 23, 1903.
NO MODEL. 4 SHEETS—SHEET 4.

No. 746,805.

Patented December 15, 1903.

UNITED STATES PATENT OFFICE.

JOHN T. FARMER, OF ORANGE, NEW JERSEY.

APPARATUS FOR HEATING AIR.

SPECIFICATION forming part of Letters Patent No. 746,805, dated December 15, 1903.

Application filed March 23, 1903. Serial No. 149,167. (No model.)

*To all whom it may concern:*

Be it known that I, JOHN TAYLOR FARMER, a subject of the King of Great Britain, and a resident of Orange, in the county of Essex and State of New Jersey, have invented a new and useful Apparatus for Heating Air, of which the following is a specification.

My invention consists of an air-heater whose object is to abstract part of the heat carried away by the products of combustion of a furnace and to utilize the heat thus abstracted by applying it to the fresh air which is needed for combustion in the furnace. I do not claim as new the principle of thus conserving heat, as I am aware that this principle is frequently applied in what are known as "regenerative" furnaces. I do claim, however, that the general form of heater described embodies a new and useful construction which renders possible the economizing of the waste heat of the products of combustion in situations where such economy has not before been practicable.

The apparatus by which I attain the aforementioned objects is illustrated in the accompanying drawings, of which—

Figure 1:
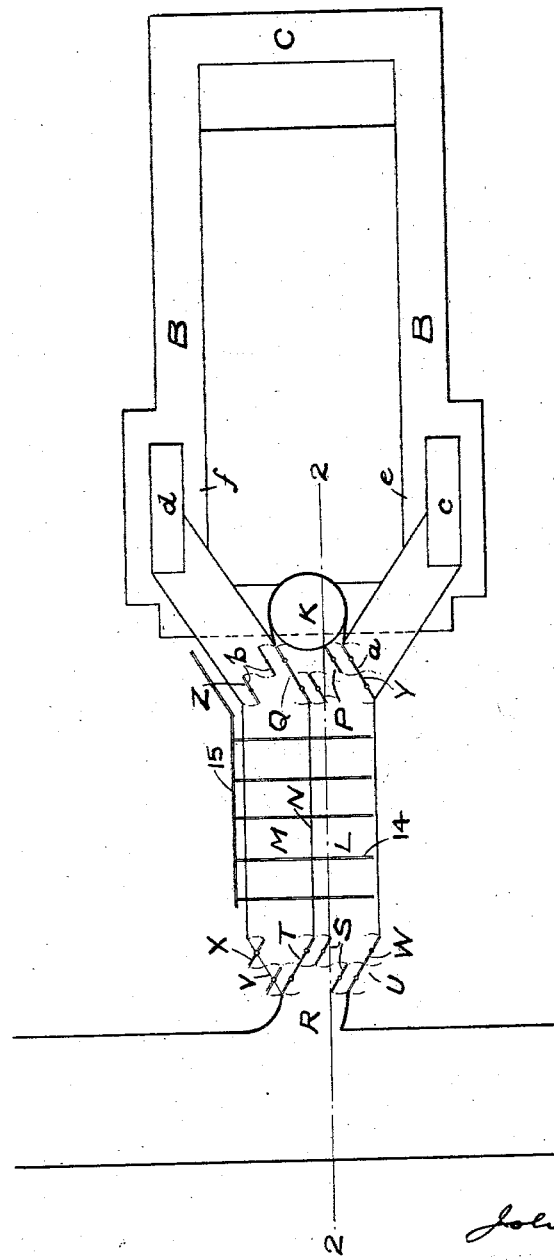
Figure 2:
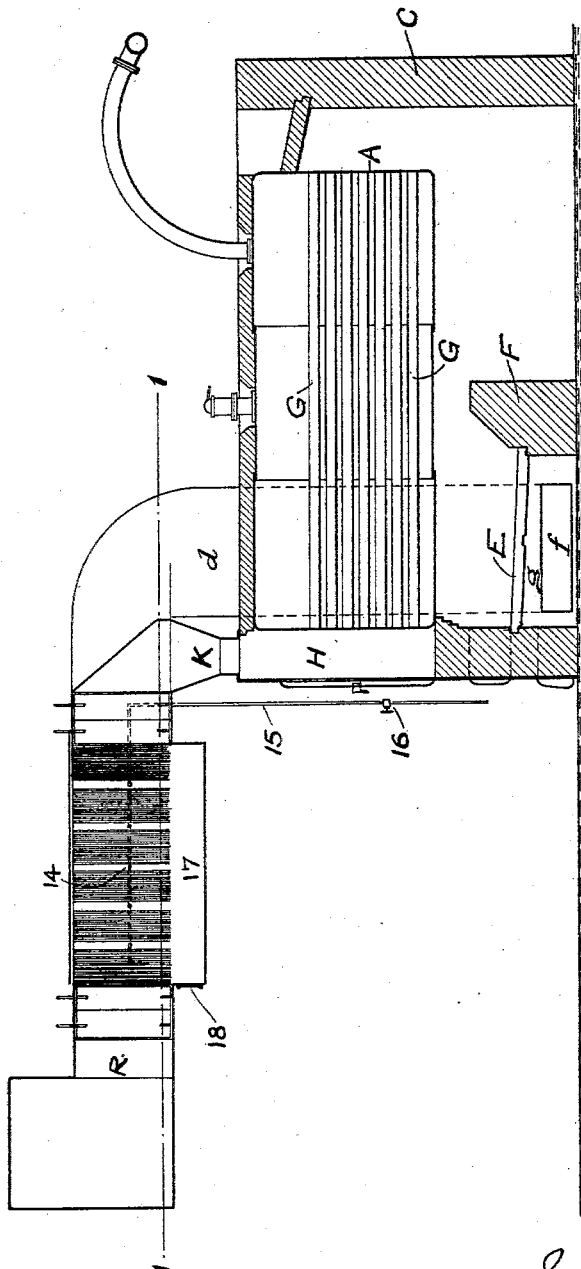
Figure 3:
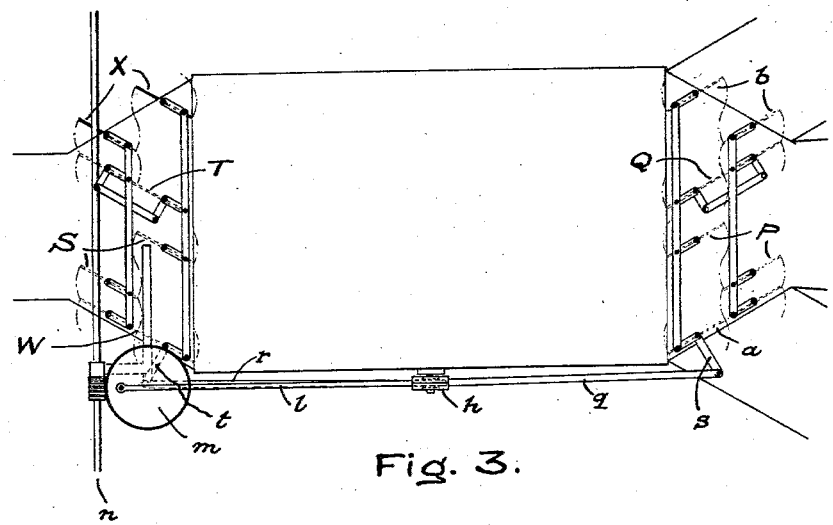
Figure 4:
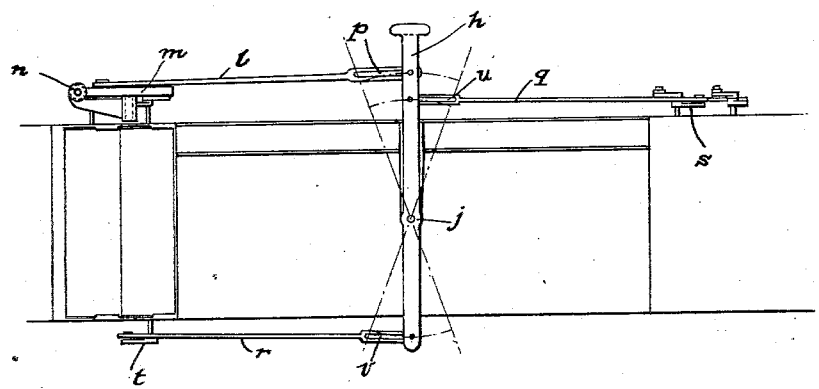
Figure 5:
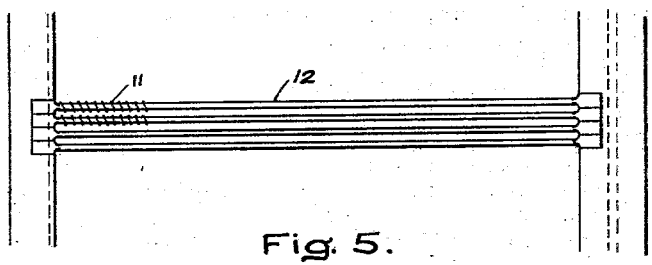
Figure 6:
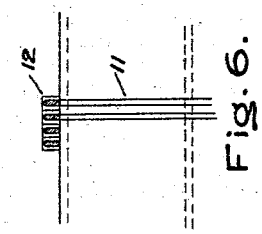
Figure 7:
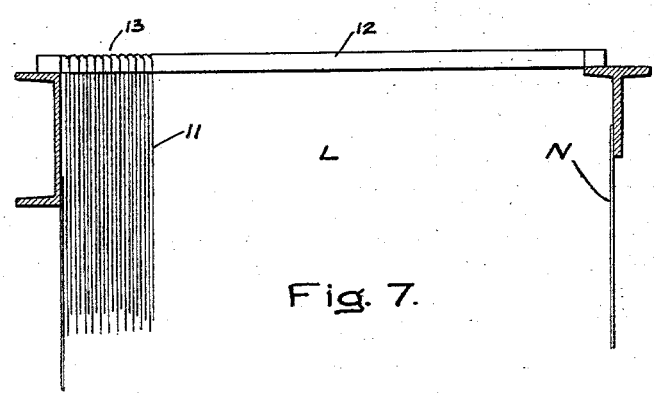
Figure 8:
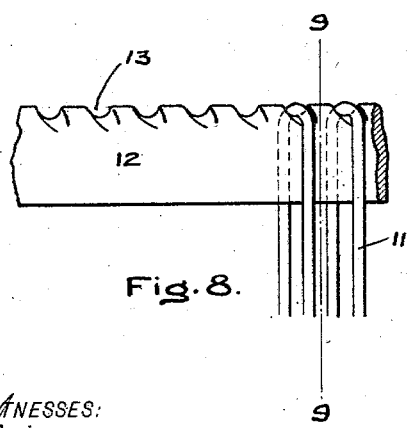
Figure 9:
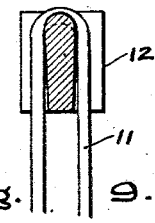

Figure 1 is a plan view of a return tubular boiler with my heater attached to the uptake, a section being taken on the line 1 1 in Fig. 2. Fig. 2 is a longitudinal elevation of the boiler and heater shown in plan in Fig. 1, a section being taken on the line 2 2 in Fig. 1. Fig. 3 is a plan view of the heater, showing the mechanism used for actuating the dampers. Fig. 4 is a longitudinal elevation of the heater, showing the mechanism used for actuating the dampers. Fig. 5 is a plan view showing in detail the arrangement of the heat-absorbing material. Fig. 6 is an elevation of the same, a section being taken parallel to the side of the heater. Fig. 7 is an elevation of the same looking from the end of the heater. Fig. 8 is a detail in elevation of one of the cross-bars with wires suspended therefrom. Fig. 9 is a cross-section of the same on the line 9 9 in Fig. 8.

Similar characters of reference designate similar parts throughout the several views.

In the figures, A is the shell of a boiler, which is erected in the usual way in a setting of brickwork with side walls B B and back wall C. The boiler is provided with a grate E, on which coal or other combustible is burned. The products of combustion pass back over the bridge-wall F to the back of the boiler, thence through the tubes G G to the smoke-box H at the front end, whence they depart up the uptake K. This process up to this point is all according to the usual practice.

My heater is arranged to form part of the flue connection. It consists of a double flue L M, the two halves of which are separated by a partition N. The uptake K of the boiler leads into the heater at one end, and the passages into the two halves L M of the heater are governed by sets of dampers P Q. The way in which these dampers are arranged to be actuated will be more fully described hereinafter. For the present it is sufficient to say that they permit of the gases being turned into either the passage L or the passage M. At the further end of the heater the passages L M come together again in one flue R, which leads away to the stack or fan. The openings of the passages L M into the flue R are governed by dampers S T, by which means either passage L or M can be opened to the flue R, leading to the fan or stack. A continuous passage is thus formed for the products of combustion from the uptake K, with alternative path through L or M to the flue R. At the point where the passages L and M converge into the flue R they are also provided with openings U V, which connect to the outside air. In the present case the connection is to the atmosphere direct; but it might be arranged with the openings U V connected to the discharge of a fan, so that fresh air could be forced into the chambers L or M. The openings U V in any case are provided with sets of dampers W X, by which they can be opened or closed. At the other end of the heater, at the point where the gases enter, the heater is provided with openings Y and Z for the passages L and M. These openings are governed by sets of dampers a b. These openings Y Z lead to passages c d, which pass down the side walls of the boiler and discharge at e f into the ash-pit g below the boiler-grate E. A continuous passage is thus formed for the fresh air from the intake, with an alternative path through the passage L or M and through the passage c or d to the space g below the grate E.

The sets of dampers P Q a b S T W X are all connected together with levers and connecting-rods in such a way that the dampers P b S X are wide open while the dampers Q a T W are shut, and vice versa. Automatic mechanism is provided for instantaneously changing the condition of these dampers at regular intervals. The mechanism shown has for its principal element a weighted lever h, pivoted at a point j. This lever is caused to rock to and fro, motion being imparted from a reciprocating rod l, driven by any convenient means, as by a worm-wheel m, driven from a uniformly-rotating shaft n. The rod l where it engages the arm h is slotted at p. The rod l pushes the arm h to the highest point of its travel, from which point the arm falls by gravity, this being permitted by the slot p. The arm h is also connected to rods q r, which actuate the systems of dampers at the two ends of the heater. The rod q is pivoted to the lever s, which opens and closes the dampers P Q a b, while the rod r is pivoted to the lever t, which opens and closes the dampers S T W X. The rods q r have slots u v where they are connected to the weighted arm h. The weighted arm in its movement to the highest point of its travel does not carry the rods q r with it on account of the play allowed by the slots; but on reaching the highest point the pin in the weighted arm comes in contact with the end of the slot, and in its rapid downward movement the weighted arm carries along the rods q r, and consequently the levers s t, and thus reverses the dampers at both ends of the heater.

In the chambers L M are arranged masses of heat-absorbent material. Thus while the dampers P S are open the material in the passage L is absorbing heat from the gases passing out through the passage L to the flue R. At the same moment the dampers X b allow fresh air to pass in through the passage M, which air on its way to the ash-pit g absorbs heat which had been given up by the hot gases in a previous stage. The material in L keeps on getting hotter and that in M gets cooler until the moment when the dampers are reversed. Then fresh air begins to pass in through L, taking up the heat stored in the material in that chamber, while the dampers Q T, being open, allow the hot gases to pass through the passage M and replenish the store of heat in the material in that chamber. In arranging the absorbent material to take up the heat it is desirable to make as large as possible the exposed surface which takes up the heat of the gases and gives up heat to the air. One method of achieving this is shown in Figs. 5 to 9. Here fine wire is used as the material which takes up the heat. The wire is in lengths bent double at the center. These lengths of wire 11 are suspended from the bars 12, the two ends hanging loose in a vertical direction. The bars 12 are supported at their ends on the sides of the chambers L and M. They are provided with notches 13, in which the bends of the lengths of wire lie. These space the wires and being cut in an oblique direction bring the individual wires into a staggered position, which improves the distribution of the gases and the absorption of heat.

It is desirable to have a series of perforated tubes 14 in the chambers L and M connected to a steam-pipe 15. This steam-pipe is controlled by a valve 16. This valve can be opened occasionally for a moment, and any dust and soot which have lodged on the wires can be blown off.

The chambers L and M are arranged with a soot-collecting pan 17 underneath, which can be cleaned out occasionally through a door 18.

What I claim as my invention, and desire to secure by Letters Patent, is—

1. The combination of a furnace; fresh-air conduits leading thereto; an uptake; a discharge-flue; an air-heater consisting of one or more pairs of chambers containing heat-absorbing material; passages from each of said chambers to the uptake of the furnace, to the fresh-air conduits, to the discharge-flue and to the atmosphere; a series of dampers governing each of said passages; and mechanism for operating said dampers to direct through said chambers alternately, the products of combustion from the uptake to the discharge-flue, and the air from the atmosphere to the fresh-air conduits; all substantially as, and for the purposes, described.

2. The combination of a furnace; fresh-air conduits leading thereto; an uptake; a discharge-flue; an air-heater consisting of one or more pairs of chambers containing heat-absorbing material; passages from each of said chambers to the uptake of the furnace, to the fresh-air conduits, to the discharge-flue, and to the atmosphere; a series of dampers governing each of said passages; and mechanism for operating said dampers periodically and instantaneously to direct through said chambers alternately, the products of combustion from the uptake to the discharge-flue, and the air from the atmosphere to the fresh-air conduits; all substantially as, and for the purposes described.

3. The combination of a furnace; fresh-air conduits leading thereto; an uptake; a discharge-flue; an air-heater consisting of one or more pairs of chambers; heat-absorbing material in said chambers in the form of metal wire suspended on frames; passages from each of said chambers to the uptake of the furnace, to the fresh-air conduits, to the discharge-flue, and to the atmosphere; a series of dampers governing each of said passages; and mechanism for operating said dampers to direct through said chambers alternately, the products of combustion from the uptake to the discharge-flue, and the air from the atmosphere to the fresh-air conduits; all substantially as, and for the purposes, described.

4. The combination of a furnace; fresh-air conduits leading thereto; an uptake; a discharge-flue; an air-heater consisting of one or more pairs of chambers; bars supported in the upper part of said chambers; lengths of wire bent over and supported by said bars; passages from each of said chambers to the uptake of the furnace, to the fresh-air conduits, to the discharge-flue, and to the atmosphere; a series of dampers governing each of said passages; and mechanism for operating said dampers to direct through said chambers alternately, the products of combustion from the uptake to the discharge-flue, and the air from the atmosphere to the fresh-air conduits; all substantially as, and for the purposes, described.

5. The combination of a furnace; fresh-air conduits leading thereto; an uptake; a discharge-flue; an air-heater consisting of one or more pairs of chambers containing heat-absorbing material; passages from each of said chambers to the uptake of the furnace, to the fresh-air conduits, to the discharge-flue, and to the atmosphere; a series of dampers governing each of said passages; mechanism for operating said dampers to direct through said chambers alternately, the products of combustion from the uptake to the discharge-flue, and the air from the atmosphere to the fresh-air conduits; and means for clearing any deposit of soot from the surface of the heat-absorbing material; all substantially as, and for the purposes, described.

6. The combination of a furnace; fresh-air conduits leading thereto; an uptake; a discharge-flue; an air-heater consisting of one or more pairs of chambers containing heat-absorbing material; passages from each of said chambers to the uptake of the furnace, to the fresh-air conduits, to the discharge-flue, and to the atmosphere; a series of dampers governing each of said passages; mechanism for operating said dampers to direct through said chambers alternately, the products of combustion from the uptake to the discharge-flue, and the air from the atmosphere to the fresh-air conduits; and perforated tubes in said chambers connected to a steam-main; all substantially as, and for the purposes, described.

JOHN T. FARMER.

Witnesses:
H. E. GREEN,
E. V. REILLY.